US011164071B2

(12) United States Patent
El-Khamy et al.

(10) Patent No.: US 11,164,071 B2
(45) Date of Patent: Nov. 2, 2021

(54) METHOD AND APPARATUS FOR REDUCING COMPUTATIONAL COMPLEXITY OF CONVOLUTIONAL NEURAL NETWORKS

(71) Applicant: Samsung Electronics Co., Ltd., Suwon-si (KR)

(72) Inventors: Mostafa El-Khamy, San Diego, CA (US); Yoo Jin Choi, San Diego, CA (US); Jungwon Lee, San Diego, CA (US)

(73) Assignee: Samsung Electronics Co., Ltd.

( * ) Notice: Subject to any disclaimer, the term of this patent is extended or adjusted under 35 U.S.C. 154(b) by 1005 days.

(21) Appl. No.: 15/634,537

(22) Filed: Jun. 27, 2017

(65) Prior Publication Data

US 2018/0300624 A1 Oct. 18, 2018

Related U.S. Application Data

(60) Provisional application No. 62/486,626, filed on Apr. 18, 2017.

(51) Int. Cl.
*G06N 3/06* (2006.01)
*G06N 3/08* (2006.01)
(Continued)

(52) U.S. Cl.
CPC ............ *G06N 3/06* (2013.01); *G06F 5/01* (2013.01); *G06N 3/04* (2013.01); *G06N 3/08* (2013.01);
(Continued)

(58) Field of Classification Search
CPC .......... G06N 3/08; G06N 3/04; G06N 3/0454; G06N 3/084; G06N 20/00; G06N 3/06; G06F 5/01; G06F 17/16; G06F 2207/4824
(Continued)

(56) References Cited

U.S. PATENT DOCUMENTS

| 9,274,036 | B2 | | 3/2016 | Malik et al. |
| 9,430,697 | B1 | * | 8/2016 | Iliadis ................ G06K 9/00221 |

(Continued)

FOREIGN PATENT DOCUMENTS

| WO | WO-2016090520 A1 * | 6/2016 | ........... G06K 9/6273 |
| WO | WO-2017129325 A1 * | 8/2017 | ........... G06N 3/0454 |
| WO | WO-2018073975 A1 * | 4/2018 | ............. G06N 3/082 |

OTHER PUBLICATIONS

Chen et al., "DeepLab: Semantic Image Segmentation with Deep Convolutional Nets, Atrous Convolution, and Fully Connected CRFs" Jun. 2, 2016, pp. 1-14. (Year: 2016).*

(Continued)

*Primary Examiner* — Miranda M Huang
*Assistant Examiner* — Chase P. Hinckley
(74) *Attorney, Agent, or Firm* — Innovation Counsel LLP (57) ABSTRACT

Disclosed herein is convolutional neural network (CNN) system for generating a classification for an input image. According to an embodiment, the CNN system comprises a sequence of neural network layers configured to: derive a feature map based on at least the input image; puncture at least one selection among the feature map and a kernel by setting the value of one or more elements of a row of the at least one selection to zero according to a pattern and cyclic shifting the pattern by a predetermined interval per row to set the value of one or more elements of the rest of the rows of the at least one selection according to the cyclic shifted pattern; convolve the feature map with the kernel to generate a first convolved output; and generate the classification for the input image based on at least the first convolved output.

18 Claims, 6 Drawing Sheets

(51) Int. Cl.
*G06N 3/04* (2006.01)
*G06F 5/01* (2006.01)
*G06F 17/16* (2006.01)

(52) U.S. Cl.
CPC ...... *G06F 17/16* (2013.01); *G06F 2207/4824* (2013.01); *G06N 3/0454* (2013.01); *G06N 3/084* (2013.01)

(58) Field of Classification Search
USPC .......................................................... 706/25
See application file for complete search history.

(56) References Cited

U.S. PATENT DOCUMENTS

| | | | |
|---|---|---|---|
| 9,576,224 B2* | 2/2017 | Iliadis | G06K 9/00288 |
| 9,779,786 B1* | 10/2017 | Wu | G06N 3/08 |
| 9,916,522 B2* | 3/2018 | Ros Sanchez | G06N 3/084 |
| 10,402,700 B2* | 9/2019 | van den Oord | G06K 9/66 |
| 10,482,155 B2* | 11/2019 | Werner | G06F 17/153 |
| 10,534,994 B1* | 1/2020 | Kaul | G06N 3/084 |
| 10,546,237 B2* | 1/2020 | Heifets | G06K 9/627 |
| 10,691,975 B2* | 6/2020 | Bagherinezhad | G06N 3/063 |
| 2015/0117760 A1* | 4/2015 | Wang | G06K 9/66 382/157 |
| 2015/0189193 A1* | 7/2015 | Kappeler | G11B 27/034 386/278 |
| 2015/0339570 A1 | 11/2015 | Scheffler | |
| 2016/0180196 A1* | 6/2016 | Taylor | G06K 9/6215 382/103 |
| 2016/0321784 A1* | 11/2016 | Annapureddy | G06N 3/082 |
| 2016/0358068 A1 | 12/2016 | Brothers et al. | |
| 2017/0011288 A1 | 1/2017 | Brothers et al. | |
| 2017/0024642 A1 | 1/2017 | Xiong et al. | |
| 2017/0039456 A1 | 2/2017 | Saberian et al. | |
| 2017/0103308 A1* | 4/2017 | Chang | G06N 3/04 |
| 2017/0124711 A1* | 5/2017 | Chandraker | G06N 3/0454 |
| 2017/0200078 A1* | 7/2017 | Bichler | G06N 3/049 |
| 2017/0200094 A1* | 7/2017 | Bruestle | G06N 3/08 |
| 2017/0344882 A1* | 11/2017 | Ambrose | G06N 3/0454 |
| 2017/0345130 A1* | 11/2017 | Wang | G06T 3/4053 |
| 2018/0027224 A1* | 1/2018 | Javidnia | H04N 13/271 382/154 |
| 2018/0032857 A1* | 2/2018 | Lele | G06N 3/04 |
| 2018/0046894 A1* | 2/2018 | Yao | G06F 7/483 |
| 2018/0046898 A1* | 2/2018 | Lo | G06F 17/16 |
| 2018/0046906 A1* | 2/2018 | Dally | G06F 7/523 |
| 2018/0060649 A1* | 3/2018 | Kastaniotis | G06K 9/00295 |
| 2018/0060701 A1* | 3/2018 | Krishnamurthy | G06K 9/6255 |
| 2018/0096226 A1* | 4/2018 | Aliabadi | G06N 3/10 |
| 2018/0129935 A1* | 5/2018 | Kim | G06N 3/063 |
| 2018/0137406 A1* | 5/2018 | Howard | G06N 3/082 |
| 2018/0137417 A1* | 5/2018 | Theodorakopoulos | G06N 3/0454 |
| 2018/0139458 A1* | 5/2018 | Wang | H04N 19/17 |
| 2018/0164866 A1* | 6/2018 | Turakhia | G06N 3/063 |
| 2018/0174031 A1* | 6/2018 | Yang | G06N 3/082 |
| 2018/0181857 A1* | 6/2018 | Mathew | G06N 3/0454 |
| 2018/0181864 A1* | 6/2018 | Mathew | G06N 3/08 |
| 2018/0189215 A1* | 7/2018 | Boesch | G06N 3/08 |
| 2018/0189595 A1* | 7/2018 | Yang | G06K 9/6217 |
| 2018/0189651 A1* | 7/2018 | Henry | G06N 3/04 |
| 2018/0204110 A1* | 7/2018 | Kim | G06N 3/0454 |
| 2018/0218275 A1* | 8/2018 | Arrigoni | G06N 7/005 |
| 2018/0225550 A1* | 8/2018 | Jacobsen | G06N 3/04 |
| 2018/0285254 A1* | 10/2018 | Baum | G06F 17/10 |
| 2018/0285734 A1* | 10/2018 | Chen | G06N 3/08 |
| 2018/0293691 A1* | 10/2018 | Nurvitadhi | G06F 12/0831 |
| 2018/0300605 A1* | 10/2018 | Ambardekar | G06F 1/324 |
| 2018/0341872 A1* | 11/2018 | Wang | G06T 7/11 |
| 2019/0156201 A1* | 5/2019 | Bichler | G06N 3/063 |
| 2019/0286953 A1* | 9/2019 | Farhadi | G06N 3/04 |
| 2019/0325203 A1* | 10/2019 | Yao | G06N 20/00 |
| 2019/0340497 A1* | 11/2019 | Baraniuk | G06N 3/0454 |
| 2019/0392297 A1* | 12/2019 | Lau | G06N 3/08 |

OTHER PUBLICATIONS

Figurnov et al., "PerforatedCNNs: Acceleration through Elimination of Redundant Convolutions" Oct. 16, 2016, NIPS 2016, pp. 1-12. (Year: 2016).*
Giusti et al., "Fast Image Scanning with Deep Max-Pooling Convolutional Neural Networks" 2013, IEEE, pp. 4034-4038. (Year: 2013).*
Lebedev et al., "Fast ConvNets Using Group-wise Brain Damage" Dec. 7, 2015. (Year: 2015).*
Anwar et al., "Structured Pruning of Deep Convolutional Neural Networks" Dec. 29, 2015. (Year: 2015).*
Changpinyo et al., "The Power of Sparsity in Convolutional Neural Networks" Feb. 21, 2017, pp. 1-13. (Year: 2017).*
Chen, Mia Xu "Learning with Sparsity and Scattering in Networks" Nov. 2015, Doctoral Dissertation, Princeton University, p. i-113. (Year: 2015).*
Dong et al., "More is Less: A More Complicated Network with Less Inference Complexity" Mar. 25, 2017, pp. 1-9. (Year: 2017).*
Dumoulin et al., "A guide to convolution arithmetic for deep learning" Mar. 24, 2016, pp. 1-28. (Year: 2016).*
Galoogahi et al., "Correlation Filters with Limited Boundaries" 2015, CVF, pp. 4630-4638. (Year: 2015).*
Li et al., "Pruning Filters for Efficient ConvNets" Mar. 10, 2017, pp. 1-13. (Year: 2017).*
Molchanov et al., "Pruning Convolutional Neural Networks for Resource Efficient Transfer Learning" Nov. 19, 2016, pp. 1-5. (Year: 2016).*
Wen et al., "Learning Structured Sparsity in Deep Neural Networks" Oct. 18, 2016, pp. 1-10. (Year: 2016).*
Yang et al., "Designing Energy-Efficient Convolutional Neural Networks using Energy-Aware Pruning" Apr. 12, 2017. (Year: 2017).*
Zhang et al., "Split-Brain Autoencoders: Unsupervised Learning by Cross-Channel Prediction" Apr. 4, 2017, pp. 1-11. (Year: 2017).*
Long et al., "Fully Convolutional Networks for Semantic Segmentation" 2015, pp. 3431-3440. (Year: 2015).*
Bagherinezhad et al., "LCNN: Lookup-based Convolutional Neural Network" Nov. 20, 2016. (Year: 2016).*
Dai et al., "Deformable Convolutional Networks" Mar. 22, 2017. (Year: 2017).*
Iliadis et al., "DeepBinaryMask: Learning a Binary Mask for Video Compressive Sensing" Jul. 18, 2016, pp. 1-13. (Year: 2016).*
Xu et al., "Local Binary Convolutional Neural Networks" Aug. 22, 2016, pp. 1-10. (Year: 2016).*
Papyan et al., "Working Locally Thinking Globally—Part II: Stability and Algorithms for Convolutional Sparse Coding" Feb. 22, 2017, pp. 1-13. (Year: 2017).*
Shi et al., "Real-Time Single Image and Video Super-Resolution Using an Efficient Sub-Pixel Convolutional Neural Network" 2016, pp. 1874-1883. (Year: 2016).*
Anwar et al., "Structured Pruning of Deep Convolutional Neural Networks" Dec. 29, 2015, pp. 1-11. (Year: 2015).*
LeCun et al., "Backpropagation Applied to Handwritten Zip Code Recognition" 1989, pp. 541-551. (Year: 1989).*
Li et al., "Enabling Sparse Winograd Convolution by Native Pruning" Feb. 28, 2017, pp. 1-10. (Year: 2017).*
Liu et Turakhia, "Pruning of Winograd and FFT Based Convolution Algorithm" 2016, pp. 1-7. (Year: 2016).*
Liu et al., "Efficient Sparse-Winograd Convolutional Neural Networks" Feb. 19, 2017, pp. 1-4. (Year: 2017).*
Theodorakopoulos et al., "Parsimonious Inference on Convolutional Neural Networks: Learning and applying on-line kernel activation rules" Jan. 2017. (Year: 2017).*
Osendorfer et al., "Image Super-Resolution with Fast Approximate Convolutional Sparse Coding" 2014, pp. 250-257. (Year: 2014).*
Motamedi et al., "Design Space Exploration of FPGA-Based Deep Convolutional Neural Networks" Jan. 2016, pp. 575-580. (Year: 2016).*
Zennaro et Chen, "On Covariate Shift Adaptation via Sparse Filtering" Jul. 22, 2016, pp. 1-19. (Year: 2016).*

(56) References Cited

OTHER PUBLICATIONS

Tan et al., "ElasticFlow: A Complexity-Effective Approach for Pipelining Irregular Loop Nests" Nov. 2015. (Year: 2015).*
Chen et al., "Eyeriss: An Energy-Efficient Reconfigurable Accelerator for Deep Convolutional Neural Networks" Jan. 2017, pp. 127-138. (Year: 2017).*
Zhong et al., "Design Space Exploration of FPGA-based Accelerators with Multi-level Parallelism" Mar. 2017, pp. 1141-1146. (Year: 2017).*
Canis et al., "Modulo SDC Scheduling with Recurrence Minimization in High-Level Synthesis" Sep. 2014. (Year: 2014).*
Zhang et Liu, "SDC-Based Modulo Scheduling for Pipeline Scheduling" 2013, pp. 211-218. (Year: 2013).*

\* cited by examiner

METHOD AND APPARATUS FOR REDUCING COMPUTATIONAL COMPLEXITY OF CONVOLUTIONAL NEURAL NETWORKS

CROSS-REFERENCE TO RELATED APPLICATIONS

This application claims priority to and the benefit of U.S. Provisional Patent Application No. 62/486,626, titled "Method and Apparatus for Reducing Computational Complexity of Convolutional Neural Networks" and filed on Apr. 18, 2017, the entire content which is incorporated herein by reference.

RELATED FIELD

The present disclosure relates to convolutional neural networks. In particular, the present disclosure relates to a method and apparatus of reducing computational complexity of convolutional neural networks.

BACKGROUND

A convolutional neural network (CNN) system is a type of feed-forward artificial neural network that has many applications. CNN systems have evolved to be state-of-the-art in the field of machine learning, for example, in object detection, image classification, scene segmentation, and image quality improvement such as super resolution, and disparity estimation.

CNN systems generally include multiple layers of convolutional filters (also referred to as "weight kernels" or just "kernels"). Each convolution layer may receive a feature map as input, which is convolved with a kernel to generate a convolved output. Due to the large number of feature maps that may require processing at each layer, the large kernel sizes, and an increasing number of layers in deep neural networks, training and running CNN systems are generally computationally expensive. The complexity also increases with a larger input size (e.g., a full high definition (HD) image), which translates into a larger width and height of input feature maps, and all intermediate feature maps.

Many applications such as pedestrian detection require fast real-time processing. Current hardware architecture and graphical processing units (GPUs) aim at parallel processing on multiple processing units to speed up the process. However, due to the recent trend of implementing deep CNN systems on power limited electronic devices such as mobile devices, it is desirable to reduce computational burden to reduce power consumption and speed up processing time.

SUMMARY

Disclosed herein is convolutional neural network (CNN) system for generating a classification for an input image. According to an embodiment, the CNN system comprises a sequence of neural network layers configured to: derive a feature map based on at least the input image; puncture at least one selection among the feature map and a kernel by setting the value of one or more elements of a row of the at least one selection to zero according to a pattern and cyclic shifting the pattern by a predetermined interval per row to set the value of one or more elements of the rest of the rows of the at least one selection according to the cyclic shifted pattern; convolve the feature map with the kernel to generate a first convolved output; and generate the classification for the input image based on at least the first convolved output.

Further disclosed herein is computer-implemented method of generating a classification for an input image, the method performed by a convolutional neural network (CNN) system implemented by one or more computers, the CNN system including a sequence of neural network layers. According to an embodiment, the computer-implemented method comprises: deriving, by the neural network layers, a feature map based on at least the input image; puncturing, by the neural network layers, at least one selection among the feature map and a kernel by setting the value of one or more elements of a row of the at least one selection to zero according to a pattern and cyclic shifting the pattern by a predetermined interval per row to set the value of one or more elements of the rest of the rows of the at least one selection according to the cyclic shifted pattern; convolving, by the neural network layers, the feature map with the kernel to generate a first convolved output; and generating, by the neural network layers, the classification for the input image based on at least the first convolved output.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

Figure 1:
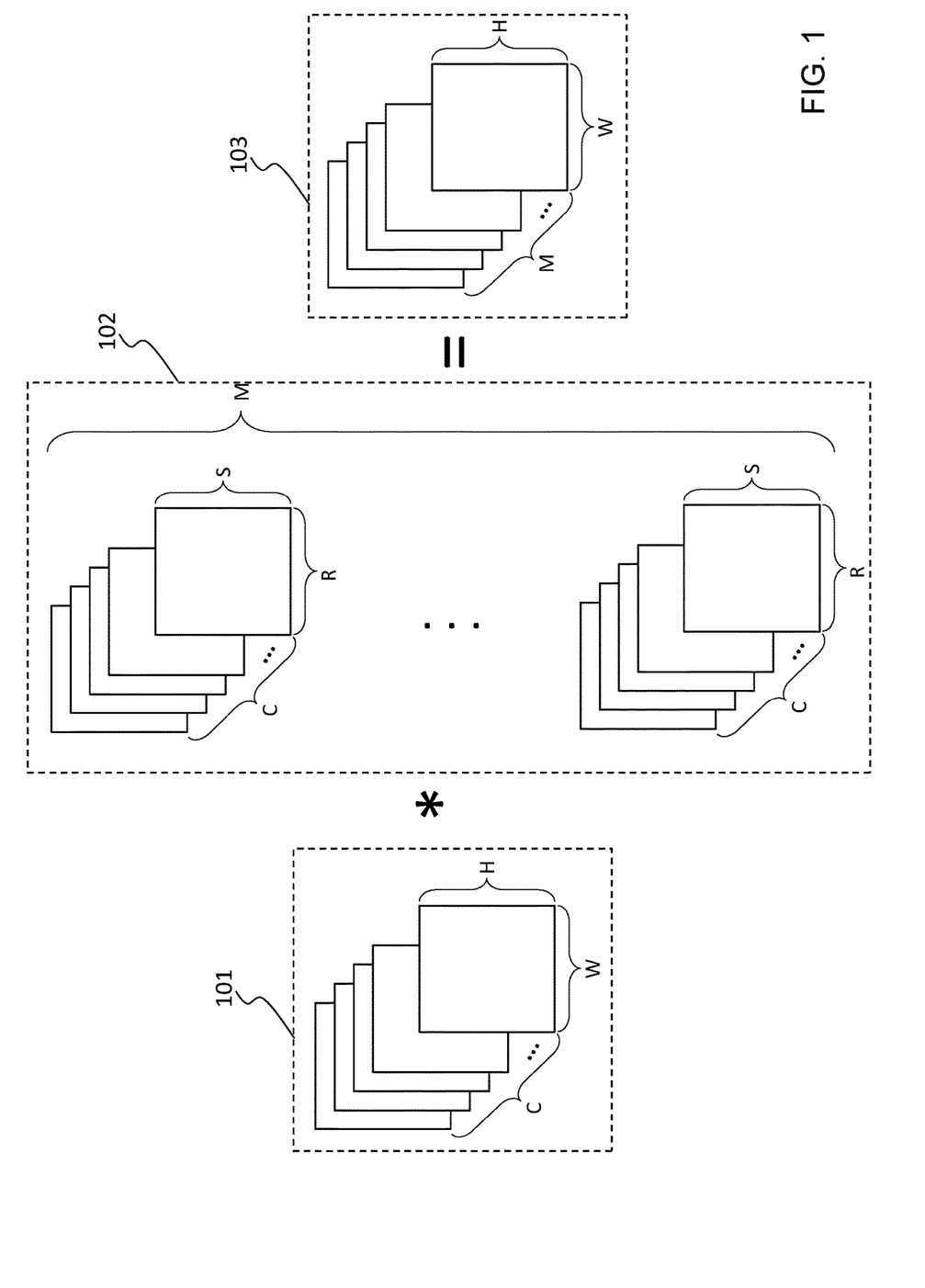
FIG. 1 illustrates an example convolution operation of a feature map and kernel to demonstrate the typical computational cost of such an operation.

As discussed earlier, training and running CNN systems are typically computationally expensive. FIG. 1 illustrates an example convolution operation of a feature map 101 and a kernel 102 to demonstrate the typical computational cost of such an operation. The feature map 101 is represented as a three-dimensional matrix structure with a C number of input channels, each channel of width of W and H, where C, W, and H are positive integers. Thus, the feature map 101 has dimensions W×H×C. The kernel 102 is represented as a four-dimensional matrix structure with dimensions M×R×S×C, where M, R, and S are also positive integers. The convolution of the feature map 101 with the kernel 102 generates a convolved output 103 having dimensions W×H×M (i.e., output has M channels).

The convolution of FIG. 1 may be represented as $$Y_o = \Sigma_{c=1}^{C} X_c * K_{o,c}$$

and implemented as follows:

```
feature map X [W] [H] [C];
kernel K [M] [R] [S] [C];
output Y [W] [H] [M];
for w in 1 to W
  for h in 1 to H
    for o in 1 to M
    {
      sum = 0 ;
      for x in 1 to R
        for y in 1 to S
          for c in 1 to C
            sum += X [w+x] [h+y] [c] * K [o] [x] [y] [c] ;
      output Y [w] [h] [o] = sum;
    }
```

The convolution may be performed by repetitive use of an array of multiply accumulate (MAC) units. A MAC is a normal sequential circuit that computes the product of two received values, and accumulates the result in a register.

According to the above implementation, for each output channel o, and for each element (w,h,o) in the output Y, a total of R×S multiplications are required, making the number of multiplications needed for each output channel to be W×H×R×S. Further, since each multiplication is followed by an accumulation, the number of MAC operations needed by the standard algorithm for all M output channels is equal to M×C×W×H×R×S, which may be quite substantial depending on the values of the dimensions. Thus, the present system and method is directed towards reducing the computational cost and complexity of convolution operations in a CNN system by puncturing (i.e., setting to zero) elements of the feature maps, kernels, or both, thereby skipping certain computations.

In other words, the present system and method exploits the redundancy in the kernels and/or the feature maps to reduce computation complexity for hardware implementation, which allows some MAC operations to be skipped. Skipping a MAC operation is equivalent to having one of the operands in the multiplication to be zero. To illustrate, consider a value (e.g., a pixel) in an input feature map as a first operand and a weight element in a kernel as a second operand. According to example embodiments of the present system and method, there are at least three approaches to reduce the computational complexity: (1) puncture the input feature map by overwriting some values to zero; (2) puncture the kernel by overwriting some values to zero; or (3) puncture both the input feature map and the kernel by overwriting some values of each to zero. Regular puncturing of feature maps is similar to subsampling to avoid loss of important features.

According to an embodiment, the present system and method provides regular puncturing of feature maps but not kernels to reduce computation and implementation complexity. The present system and method may further recover accuracy of the original network by fine-tuning of networks with regular puncturing of feature maps. According to another embodiment, the present system and method provides regular puncturing of kernels to reduce computation complexity. The present system and method may further recover accuracy of the original network by fine-tuning of networks with regular puncturing of kernels. According to another embodiment, the present system and method provides regular puncturing of both feature maps and kernels to reduce computation complexity. The present system may further recover accuracy of the original network by fine-tuning of networks with regular puncturing of both feature maps and kernels.

Figure 2:
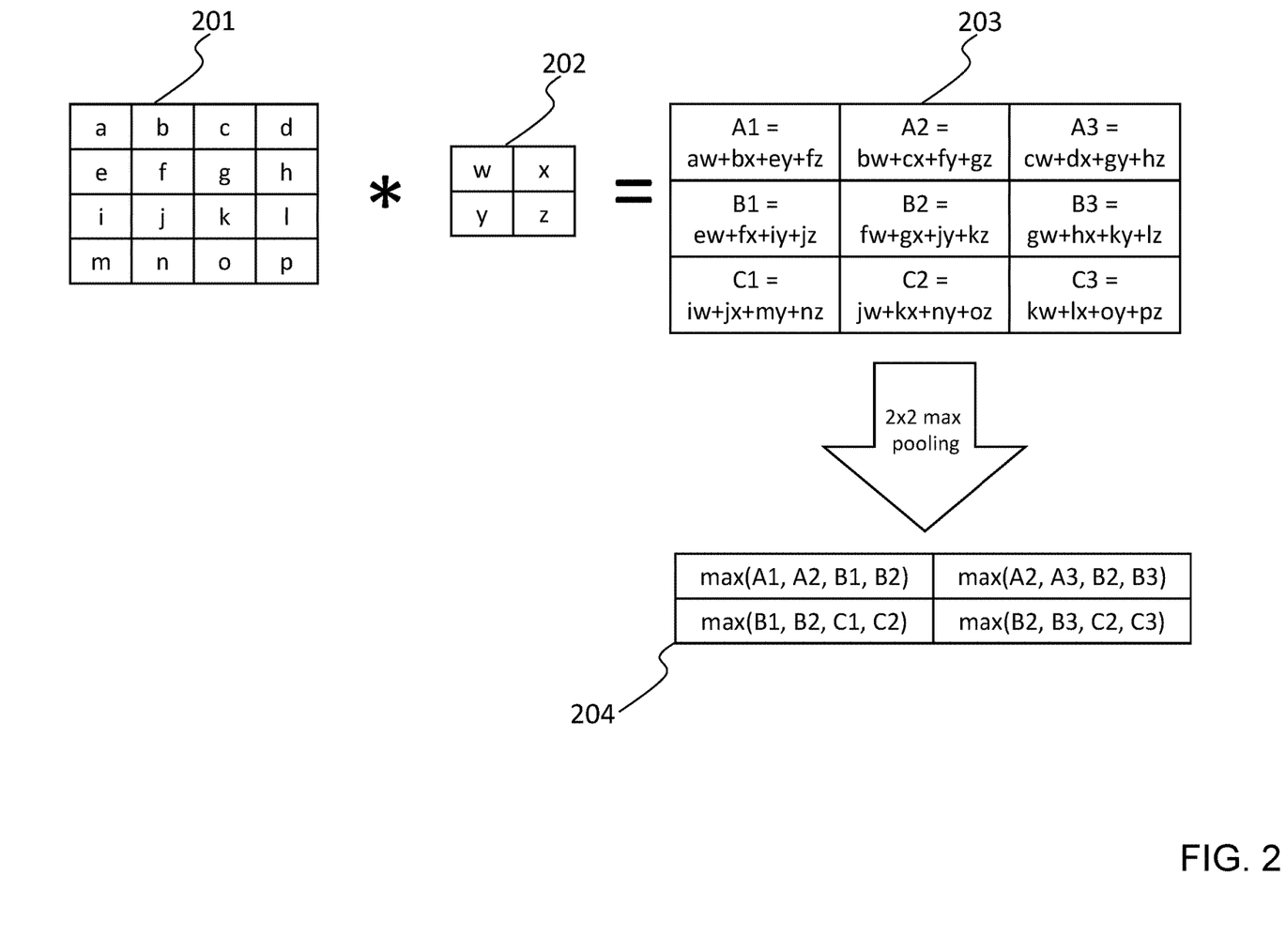
FIG. 2 illustrates an example diagram of convolving an unpunctured feature map with an unpunctured kernel.
Figure 3:
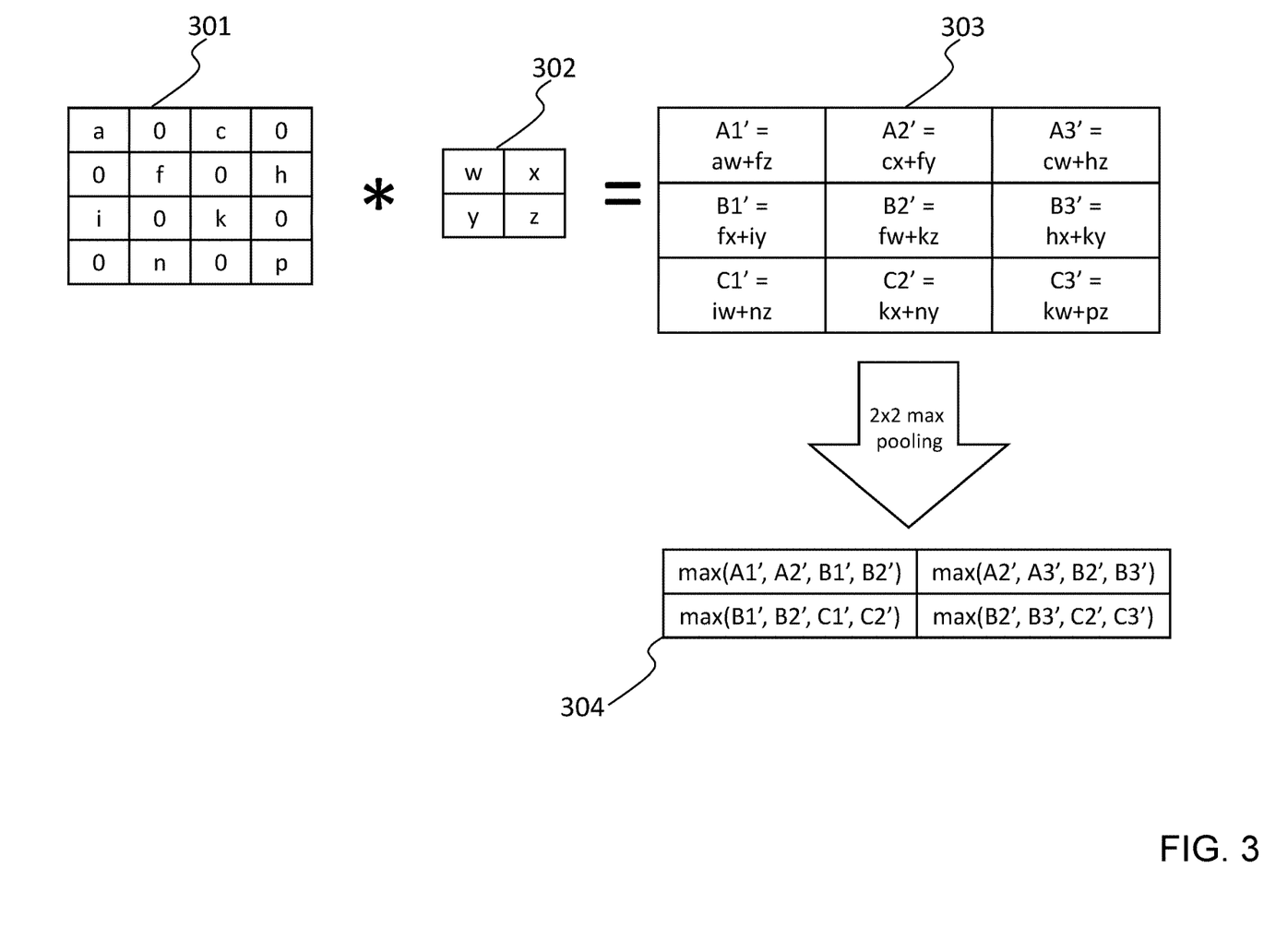
FIG. 3 illustrates an example diagram of convolving a punctured feature map with an unpunctured kernel, according to an embodiment of the present system and method.
Figure 4:
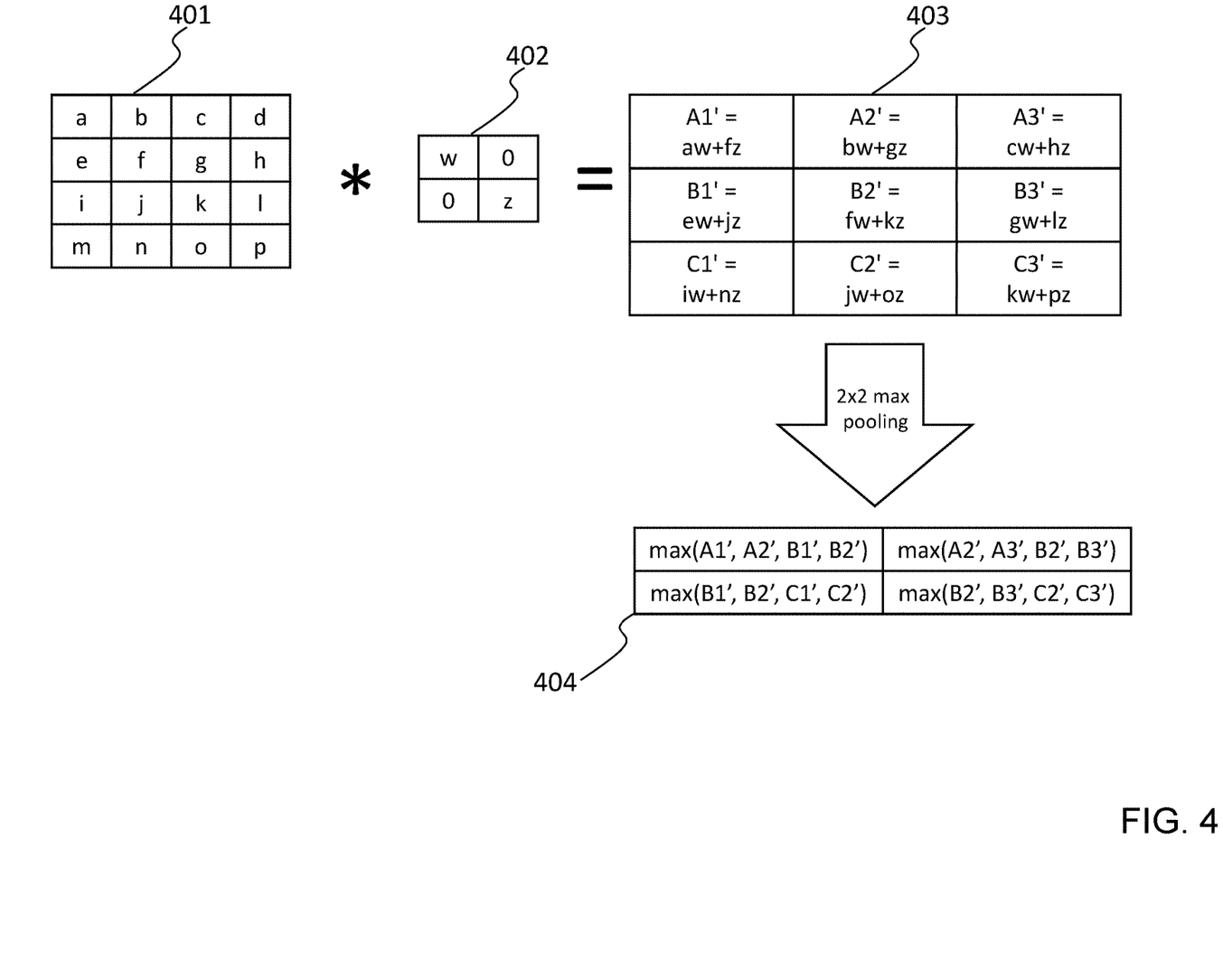
FIG. 4 illustrates an example diagram of convolving an unpunctured feature map with a punctured kernel, according to an embodiment of the present system and method.

FIG. 2 illustrates an example diagram of convolving an unpunctured feature map with an unpunctured kernel. FIG. 3 illustrates an example diagram of convolving a punctured feature map with an unpunctured kernel, according to an example embodiment. FIG. 4 illustrates an example diagram of convolving an unpunctured feature map with a punctured kernel, according to an example embodiment. In each of the examples of FIGS. 2 to 4, a two-dimensional feature map and a two-dimensional kernel are used for simplicity of explanation; however, the concept and advantages of puncturing the feature map and/or kernel are applicable to feature maps and kernels of various dimensions.

As FIG. 2 shows, convolving an unpunctured feature map 201 with an unpunctured kernel 202 requires 36 multiplication operations. In contrast, as FIGS. 3 and 4 show, convolving a punctured feature map 301 with an unpunctured kernel 302 requires only 18 multiplication operations, and similarly, convolving an unpunctured feature map 401 with a punctured kernel 402 requires only 18 multiplication operations. Thus, in each of the examples of FIGS. 3 and 4, puncturing at least one of the feature map and the kernel prior to performing the convolution significantly reduces the computational complexity of the convolution operation.

A convolved output (e.g., 203, 303, and 404) may be used as a feature map for input into a subsequent neural network layer or may be used to derive a feature map for input into a subsequent neural network layer. For example, in the case of FIGS. 2 to 4a, a 2×2 maximum pooling layer may be applied to the convolved output to reduce its dimensions before being used as a feature map for input into a subsequent neural network layer. The 2×2 maximum pooling layer reduces the size of the convolved output by selecting the maximum value among local 2×2 subsets of the convolved output. According to an embodiment, after the positions of the maximum values have been identified using the punctured feature map, the actual value (i.e., using the unpunctured feature map) at the position may be re-calculated to reduce computational complexity of maximum pooling.

According to an embodiment of the present system and method, a CNN system may puncture the feature map and/or the kernel based on the index of the elements thereof. For example, if a list of indices in an input feature map that is punctured is represented by P_X and a list of indices in a kernel that is punctured is represented by P_K, the convolutional operation may be updated as follows:

```
feature map X [W] [H] [C];
kernel K [M] [R] [S] [C];
output Y [W] [H] [M] ;
for w in 1 to W
  for h in 1 to H
    for o in 1 to M
    {
      sum = 0 ;
      for x in 1 to R
        for y in 1 to S
          for c in 1 to C
            If [w+x] [h+y] [c] Not In P_X
              If [o] [x] [y] [ c] Not In P_K
                sum += X [w+x] [h+y] [c] * K [o] [x] [y] [c] ;
      output Y [w] [h] [o] = sum;
    }
```

If P_X represents A % of the indices of the feature map, then around A % of multiplications may be saved by puncturing the feature map. Similarly, if P_K represents B % of the indices of the kernel, then another B % of the MACs may be saved by puncturing the kernel. However, for speed, the MAC operations may be performed in parallel, or in batch, where each processor may handle a set number of MACs. As such, a random puncturing of feature map and/or kernel may not provide actual reduction in computational complexity with batch processing.

For some convolutional neural networks, the kernels may be operated with a stride on the input feature map. This is equivalent to skipping some convolutional operations on the input feature maps. For example, with a stride of p, the algorithm may be modified as follows, and the complexity, i.e., a number of MAC operations, is reduced to $M \times C \times W \times H \times R \times S / p^2$.

```
feature map X [W] [H] [C] ;
kernel K [M] [R] [S] [C] ;
output Y [W] [H] [M] ;
for w in 1 to W with step p
  for h in 1 to H, with step p
    for o in 1 to M
    {
      sum = 0 ;
      for x in 1 to R
        for y in 1 to S
          for c in 1 to C
            sum += X [w+x] [h+y] [c] * K [o] [x] [y] [c] ;
      output Y [[w/p]] [[h/p]] [o] = sum;
    }
```

If the stride is greater than 1, then the computational complexity reduces by $p^2$. In some cases, the stride p may be implemented by design, for example, to achieve a specific receptive field size and not necessarily to reduce complexity.

Figure 5:
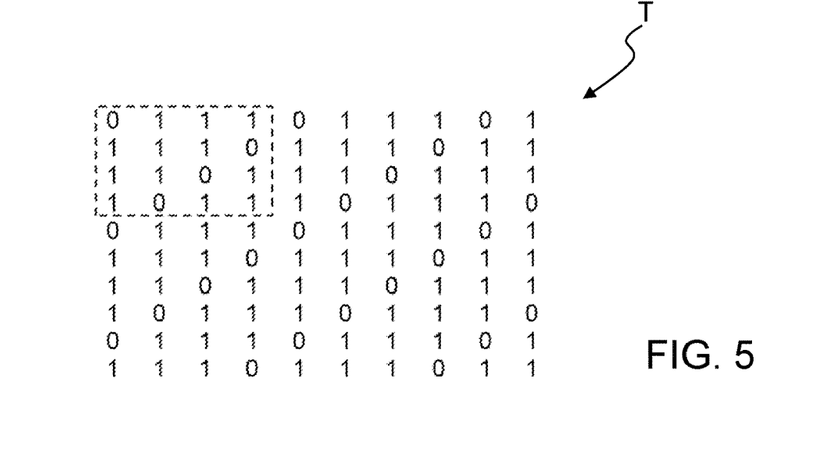
FIG. 5 illustrates an example feature map mask for puncturing a feature mask in a regular fashion, according to an embodiment of the present system and method.

According to an embodiment, the present system and method provides regular puncturing of feature maps to reduce computational complexity, whether a stride is 1 or greater. Consider a feature map mask T, shown in FIG. 5, that is defined such that one out of d elements row-wise are punctured in a regular fashion with a pattern indicated within the dotted box. The feature map X may be punctured by applying thereto mask T using a dot product operation. Alternatively, the feature map X may be punctured using the following implementation, where a puncturing interval d=4 and a cyclic shift s of the puncturing mask represented by shift value s=2:

```
for c in 1 to C
  for w in 1 to W
    for h in 1 to H,
    {
      set X [w][h][c] = 0 if mod(w + h, d) - s =0
    }
```

Similarly, regular puncturing of the $o^{th}$ kernel may be implemented as follows using a similar procedure:

```
for o in 1 to M
{
  for x in 1 to R
    for y in 1 to S
      for c in 1 to C
      {
        set K [o] [x] [y] [c] = 0 if mod(x + y, d) - s =0
      }
}
```

If the kernel size S>=d, and R>=d, then for each stride of the kernel on the feature map, there is about 1/d reduction in computational complexity. For example, consider S=R=d=4 as in the above example. The number of MACs required for this stride p is 12×C. Hence, the number of total MACs required for this convolutional layer is equal to $(d-1)/d \times M \times C \times W \times H \times R \times S / p^2$.

According to an embodiment, the same mask is applied to all C input feature maps. One form of parallel processing is to batch process the MACs at the same w,h location. The following implementation checks the mask T to determine whether a MAC operation should be performed for a particular location (w+x, h+y):

```
feature map X [W] [ H] [C];
kernel K [M] [R] [S] [C];
output Y [W] [H] [M];
for w in 1 to W with step p
  for h in 1 to H, with step p
    for o in 1 to M
    {
      sum = 0 ;
      for x in 1 to R
        for y in 1 to S
          if T[w+x][h+y] ≠ 0
          {
            for c in 1 to C
              sum += X [w+x] [h+y] [c] * K [o] [x] [y] [c] ;
          }
      output Y [[w/p]] [[h/p]] [o] = sum;
    }
```

By puncturing the feature map using a regular puncturing pattern, a processor of the CNN system is able to skip the C MAC operations every d increments in the width and height dimensions instead of checking if the position T[w+x][h+y] is masked or not. Hence, utilizing the regular puncturing pattern would result in an actual 1/d reduction in the required clock cycles with a parallel (batch) processor.

In some cases, by visual inspection or by experimentation or by measuring the sum of absolute values of a feature map, it may be determined that a certain feature map at each layer is too important to skip. In such a case, the masking may be entirely skipped for this feature map. After batch processing for C feature maps, the remaining MAC operations due to the non-masked feature maps may be processed and added to the sum at output position [w][h][o]. Such operations may be processed in parallel as well.

It is observed that there are d possible cyclic shifts of the mask T above for the convolutional layer under consideration that would achieve the same actual reduction in batch processing computational complexity. According to an embodiment, the present system and method tests the accuracy of the already trained CNN with all d different shifts, while all remaining layers remain the same. Then, the shift that achieves the best accuracy is chosen.

For example, let T(cyclic_idx) be the masking matrix T when all rows are cyclically shifted by cyclic_idx. According to an embodiment, the present system and method may select the best masking matrix at each layer in an iterative layer-by-layer manner as follows, where d_layer_idx is the value of d selected at the layer indexed by layer_idx.

```
while iter < max_iter
    for layer_idx = 1 to network_depth
    { initialize best_accuracy = 0
        for cyclic_idx = 1 to d_layer_idx {
        mask feature maps at layer indexed by layer_idx with T(cyclic_idx)
            check network accuracy,
            if accuracy is larger than best_accuracy, set cyclic_idx_max
                ←cyclic_idx,
set best_accuracy←accuracy}
            set T_layer_idx ←T(cyclic_idx_max)
        }
    }
```

At the first iteration, the best cyclic shift of the first layer may not take into account any masking performed at the consecutive layers. However, in the subsequent iterations, the best cyclic shift of the first layers may take into account all the masks that have been selected for the other consecutive layers. Iteration may be stopped if overall network accuracy is not improved.

There is generally a tradeoff in selecting the puncturing interval d. For example, a larger value of d implies less reduction in computational complexity but better accuracy due to less puncturing of the feature map. Different CNN layers may have different values of d, where d=1 implies no reduction in computational complexity. An iterative procedure, such as the one described above, may be followed to select an optimal d value, among an m number of different values of d, at each layer. That is, at each layer, m different masking matrixes may be tested assuming their first cyclic shift. Then, once the d values (d_layer_idx) are selected for each layer, the best cyclic shift (e.g., minimizes an error cost function) may be chosen for each layer by the above procedure.

Even after selection of the best cyclic shift at each layer, there may be loss in accuracy compared to the original network with no punctured feature maps. According to an embodiment, the present system and method redefines the network layers by adding a masking layer after each masked feature map to recover an original accuracy. The masking layer is similar to a pooling layer in that it may be used to reduce computational complexity. However, in contrast to a pooling layer, the masking layer does not reduce the feature map size; rather it performs a dot product of the feature map and/or kernel with the mask (e.g., mask T as previously discussed) and keeps the size of feature map and/or kernel the same, while overwriting some values of the feature map and/or kernel elements with zeros. The network may then be fine-tuned by backpropagation, in which gradients are calculated and used to modify the kernel values or weights towards reducing the error cost function or equivalently increase the objective accuracy.

Depending on the shift s, kernel size R×S, extra conditions on stride p may be imposed to ensure that all kernel weights are activated. For example, if both the feature map and the kernel have opposite puncturing patterns to one another, d=2, shift=1 and the other shift=2, and the convolutional stride p=2, then the output from the convolution will always be zero. Thus, according to an embodiment, the present system and method may set different values for the puncturing interval d of the feature map and the kernel to ensure that the output from the convolution is not zero.

According to an embodiment of the present system and method, batch convolutional processor for the $o^{th}$ output feature map can be modified to skip all MAC operations, where the kernel operand is zero as follows:

```
feature map X [W] [H] [C];
kernel K [M] [R] [S] [C];
output Y [W] [H] [M];
shift s;
for w in 1 to W with step p
    for h in 1 to H, with step p
        for o in 1 to M
    {
        sum = 0 ;
        for x in 1 to R
            for y in 1 to S
            if mod(x + y,d) − s =0
        {
            for c in 1 to C
                sum += X [w+x] [h+y] [c] * K [o] [x] [y] [c];
        }
            output Y [[w/p]] [[h/p]] [o] = sum;
    }
```

According to an embodiment, the regular puncturing pattern (also referred to as weight pruning pattern) may be set to be cyclic in the $3^{rd}$ dimension by the condition 'if mod(x+y+c,d)−s=0', and a batch processor of the CNN system may take cyclic shifts in the $3^{rd}$ dimension into account. According to another embodiment, all kernels in the $3^{rd}$ dimension may use the same puncturing pattern as above with 'if mod(x+y,d)−s≠0'.

According to an embodiment, to select the best mask for the kernels in each layer, the present system and method may select a mask that results in a largest root mean square value of the kernel after puncturing. The present system and method may effectively select the puncturing positions of the kernel with smallest weight values while constraining the puncturing pattern to be regular in all kernel dimensions.

After puncturing the kernels, to recover the original accuracy, the network may be fine-tuned by training examples to minimize the error cost function while imposing the already chosen regular puncturing patterns for each kernel. Hence, fine tuning may change only the weight values in the kernel that have not been masked by the regular pattern and leave the punctured positions to be zero.

According to an embodiment, the present system and method regularly punctures both feature maps and kernels. Hence, during batch convolutional processing, the batch operation may only be performed if both feature maps and the kernels are non-zero, i.e., if [mod(x+y, d_kernel)−2≠0] AND [T[w+x][h+y]≠0], which may result in a compound reduction in the computational complexity. Retraining the network with fine-tuning of both kernel puncturing and feature map puncturing improves an accuracy of the punctured network, according to an embodiment.

According to an embodiment, the present system and method reduces computational complexity of a CNN, including performing one or more of puncturing (setting to zero) a feature map and puncturing a kernel, where puncturing the feature map and puncturing the kernel includes setting one or more elements of a row to zero according to a predetermined pattern and cycling shifting the row at a predetermined interval. The present system and method further implements a masking layer in the CNN to allow fine-tuning with punctured feature maps and recover the accuracy.

Figure 6:
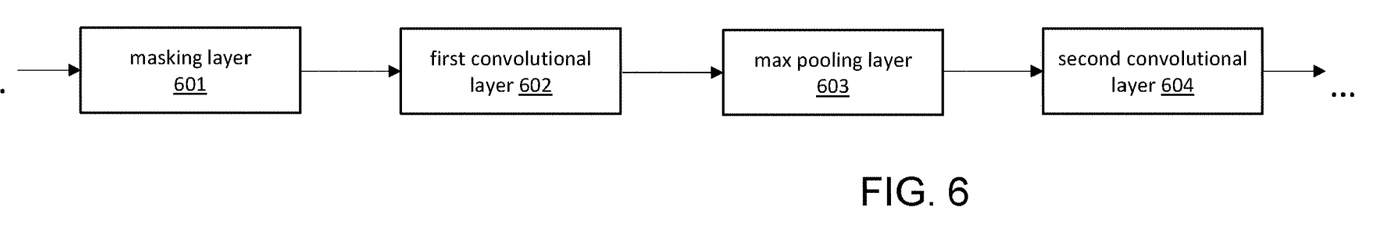
FIG. 6 illustrates an example sequence of neural network layers, according to an embodiment of the present system and method.

According to an embodiment, a convolutional neural network (CNN) system may be implemented by one or more computers for generating a classification for an input image received by the CNN system. The CNN system may include a sequence of neural network layers, such as those shown in FIG. 6. For example, the neural network layers may include a masking layer 601, a first convolutional layer 602, a max pooling layer 603, a second convolutional layer 604, and other layers.

Figure 7:
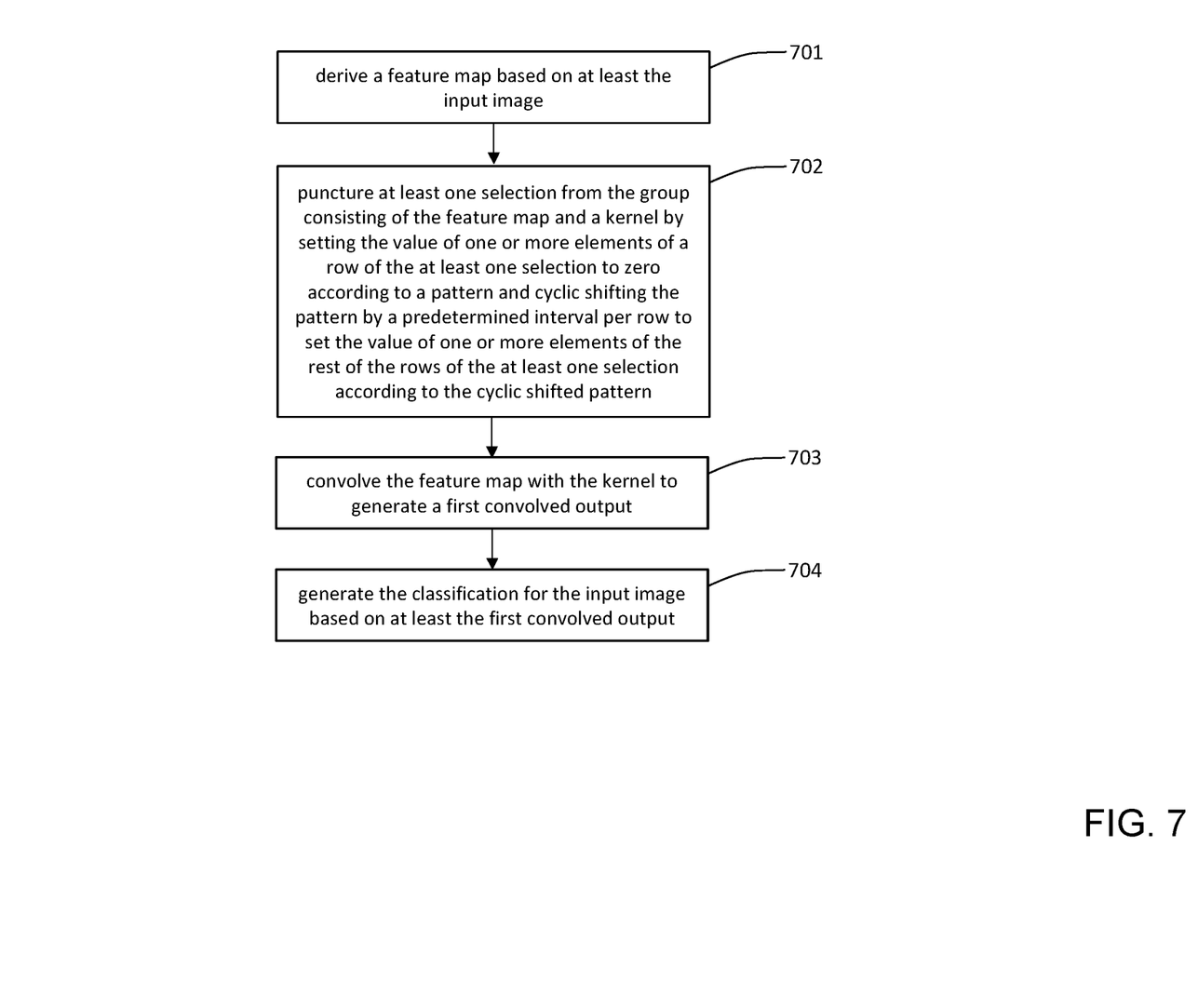
FIG. 7 illustrates a flow chart of example operations of a CNN system, according to an embodiment of the present system and method.

The sequence of neural network layers and/or other elements of the CNN system may be configured to perform the operations outlined in the flow chart of FIG. 7. The CNN system derives a feature map based on at least the input image (701). The CNN system punctures at least one selection among the feature map and a kernel (i.e., selection from the group comprising at least the feature map and the kernel) by setting the value of one or more elements of a row of the at least one selection to zero according to a pattern and cyclic shifting the pattern by a predetermined interval per row to set the value of one or more elements of the rest of the rows of the at least one selection according to the cyclic shifted pattern (702). The CNN system convolves the feature map with the kernel to generate a first convolved output (703). The CNN system generates the classification for the input image based on at least the first convolved output (704).

The process of 702 may be explained in the context of the punctured feature map 301 of FIG. 3. The first row of the punctured feature map 301 has certain of its elements set to zero according to a pattern "_0_0". The second row of the punctured feature map 301 also has certain of its elements set to zero but according to a cyclic shifted version of the pattern "_0_0", which is "0_0_" when the pattern "_0_0" is cyclic shifted by a predetermined interval of one. The rest of the rows, the third and fourth rows, are punctured in the same manner by continually shifting the pattern while maintaining the same direction of shift (i.e., left or right).

According to an embodiment, to puncture the at least one selection among the feature map and the kernel includes setting the value of an element at index (w, h) of the at least one selection to zero when:

$((w+h) \bmod d) - s = 0$, where s is an integer, shift value; d is an integer, puncture interval value >1; and w and h are index values of the element.

According to an embodiment, to puncture the at least one selection among the feature map and the kernel includes performing dot product of the at least one selection with a masking matrix, where the value of an element at index (w, h) of the masking matrix is zero when:

$((w+h) \bmod d) - s = 0$, and where the value of the element at index (w, h) of the masking matrix is one when:

$((w+h) \bmod d) - s \neq 0$, where s is an integer, shift value; d is an integer, puncture interval value >1; and w and h are index values of the element.

According to an embodiment, the CNN system may be further configured to fine-tune the sequence of neural network layers by: convolving the feature map, unpunctured, with the kernel, unpunctured, to generate a second convolved output, and evaluating the accuracy of the first convolved output according to an error cost function that compares the first convolved output and the second convolved output.

According to an embodiment, the CNN system may be further configured to fine-tune the sequence of neural network layers by puncturing the at least one selection according to variations of the shift value s to determine an optimal shift value that minimizes the error cost function.

According to an embodiment, the CNN system may be further configured to fine-tune the sequence of neural network layers by puncturing the at least one selection according to variations of the puncture interval value d to determine an optimal puncture value that minimizes the error cost function.

According to an embodiment, the CNN system may be further configured to fine-tune the sequence of neural network layers by performing backpropagation to adjust the values of the elements of the kernel by calculating gradients of the error cost function with respect to the elements of the kernel and minimizing the error cost function. If the at least one selection includes the kernel, performing backpropagation may adjust only the values of the elements of the kernel that are not set to zero by the puncturing.

According to an embodiment, if the at least one selection includes both the feature map and the kernel (i.e., both the feature map and kernel are punctured), the sequence of neural network layers may be configured to puncture the feature map and the kernel, respectively, using different puncturing interval values.

According to an embodiment, the sequence of neural network layers may be further configured to: calculate a maximum value and a maximum position corresponding to the maximum value using the at least one selection, and calculate a value at the maximum position using an unpunctured form of the at least one selection.

According to an embodiment, the cyclic shifted pattern may shift in a third dimension such that to puncture the at least one selection among the feature map and a kernel includes setting the value of an element at index (w, h, c) of the at least one selection to zero when:

$((w+h+c) \bmod d) - s = 0$, where s is an integer, shift value; d is an integer, puncture interval value >1; and w, h and c are index values of the element.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least an embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A convolutional neural network (CNN) system implemented by one or more computers for generating a classification for an input image received by the CNN system, the CNN system comprising:
    circuitry running on clock cycles, the circuitry configured to compute the product of two received values;
    at least one non-transitory computer-readable medium that stores instructions for the circuitry to:
        derive a feature map based on at least the input image;
        puncture at least one selection among the feature map and a kernel by setting a value of an element at index (w,h) of the at least one selection to zero when $((w+h) \bmod d)-s=0$, where s is an integer, shift value; d is an integer, puncture interval value >1; and w and h are index values of the element of a row within a plurality of rows, and cyclic-shifting a puncture pattern by the shift value s in each subsequent row of the plurality of rows to achieve a 1/d reduction in number of clock cycles;
        convolve the feature map with the kernel to generate a first convolved output;
        store the first convolved output in a register; and
        generate the classification for the input image based on at least the first convolved output.

2. The CNN system of claim 1, wherein to puncture the at least one selection among the feature map and the kernel includes performing dot product of the at least one selection with a masking matrix, wherein the value of an element at index (w, h) of the masking matrix is zero when:

$$((w+h) \bmod d)-s=0, \text{ and}$$

wherein the value of the element at index (w, h) of the masking matrix is one when:

$$((w+h) \bmod d)-s \neq 0.$$

3. The CNN system of claim 1, wherein the CNN system is further configured to fine-tune the sequence of neural network layers by:
    convolving the feature map, unpunctured, with the kernel, unpunctured, to generate a second convolved output, and
    evaluating the accuracy of the first convolved output according to an error cost function that compares the first convolved output and the second convolved output.

4. The CNN system of claim 3, wherein the CNN system is further configured to fine-tune the sequence of neural network layers by puncturing the at least one selection according to variations of the shift value s to determine an optimal shift value that minimizes the error cost function.

5. The CNN system of claim 3, wherein the CNN system is further configured to fine-tune the sequence of neural network layers by puncturing the at least one selection according to variations of the puncture interval value d to determine an optimal puncture value that minimizes the error cost function.

6. The CNN system of claim 3, wherein the CNN system is further configured to fine-tune the sequence of neural network layers by performing backpropagation to adjust the values of the elements of the kernel by calculating gradients of the error cost function with respect to the elements of the kernel and minimizing the error cost function.

7. The CNN system of claim 6, wherein the at least one selection includes the kernel, and performing backpropagation adjusts only the values of the elements of the kernel that are not set to zero by the puncturing.

8. The CNN system of claim 1, wherein the sequence of neural network layers is further configured to:
    calculate a maximum value in the first convolved output using the at least one selection,
    determine the maximum position corresponding to the maximum value in the first convolved output, and
    calculate a value at the maximum position using an unpunctured form of the at least one selection.

9. The CNN system of claim 1, wherein the cyclic shifted pattern shifts in a third dimension such that to puncture the at least one selection among the feature map and a kernel includes setting the value of an element at index (w, h, c) of the at least one selection to zero when:

$$((w+h+c) \bmod d)-s=0,$$

where s is an integer, shift value; d is an integer, puncture interval value >1;
and w, h and c are index values of the element.

10. A computer-implemented method of generating a classification for an input image, the method performed by a convolutional neural network (CNN) system implemented by one or more computers, the CNN system including a sequence of neural network layers, the method comprising:
    causing circuitry to execute instructions stored in at least one non-transitory computer-readable medium, the instructions being for:
        deriving, by the neural network layers, a feature map based on at least the input image;

puncturing, by the neural network layers, at least one selection among the feature map and a kernel by setting the value of an element at index (w,h) of the at least one selection to zero when ((w+h) modulo d)−s=0, where s is an integer, shift value; d is an integer, puncture interval value >1; and w and h are index values of the element of a row within a plurality of rows, and cyclic-shifting the puncturing by the shift value s in each subsequent row of the plurality of rows to achieve a 1/d reduction in number of clock cycles;

convolving, by the neural network layers, the feature map with the kernel to generate a first convolved output;

storing the first convolved output in a register; and generating, by the neural network layers, the classification for the input image based on at least the first convolved output.

11. The CNN system of claim 1, wherein the cyclic shift pattern shifts in a third dimension such that puncturing the at least one selection among the feature map and a kernel includes setting the value of an element at index (w, h, c) of the at least one selection to zero when:

$$((w+h+c) \bmod d) - s = 0,$$

where s is an integer, shift value; d is an integer, puncture interval value >1; and w, h and c are index values of the element.

12. The computer-implemented method of claim 10, wherein puncturing the at least one selection among the feature map and a kernel includes performing dot product of the at least one selection with a masking matrix, wherein the value of an element at index (w, h) of the masking matrix is zero when:

$$((w+h) \bmod d) - s = 0, \text{ and}$$

wherein the value of the element at index (w, h) of the masking matrix is one when:

$$((w+h) \bmod d) - s \neq 0.$$

13. The computer-implemented method of claim 10 further comprising fine-tuning the sequence of neural network layers by:

convolving the feature map, unpunctured, with the kernel, unpunctured, to generate a second convolved output, and evaluating the accuracy of the first convolved output according to an error cost function that compares the first convolved output and the second convolved output.

14. The computer-implemented method of claim 13, further comprising fine-tuning the sequence of neural network layers by puncturing the at least one selection according to variations of the shift value s to determine an optimal shift value that minimizes the error cost function.

15. The computer-implemented method of claim 13, further comprising fine-tuning the sequence of neural network layers by puncturing the at least one selection according to variations of the puncture interval value d to determine an optimal puncture value that minimizes the error cost function.

16. The computer-implemented method of claim 13, further comprising fine-tuning the sequence of neural network layers by performing backpropagation to adjust the values of the elements of the kernel by calculating gradients of the error cost function with respect to the elements of the kernel and minimizing the error cost function.

17. The computer-implemented method of claim 16, wherein the at least one selection includes the kernel, and performing backpropagation adjusts only the values of the elements of the kernel that are not set to zero by the puncturing.

18. The computer-implemented method of claim 10, further comprising:

calculating a maximum value in the first convolved output using the at least one selection, determining the maximum position corresponding to the maximum value in the first convolved output, and calculating a value at the maximum position using an unpunctured form of the at least one selection.

* * * * *